(12) United States Patent
Ueda et al.

(10) Patent No.: US 12,714,537 B2
(45) Date of Patent: Aug. 25, 2026

(54) DENTAL TREATMENT APPARATUS AND METHOD FOR CONTROLLING DENTAL TREATMENT APPARATUS

(71) Applicant: J. MORITA MFG. CORP., Kyoto (JP)

(72) Inventors: Tomoaki Ueda, Kyoto (JP); Koichiro Adachi, Kyoto (JP); Kyohei Kato, Kyoto (JP); Seiichiro Yamashita, Kyoto (JP); Kazunari Matoba, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 976 days.

(21) Appl. No.: 17/535,177

(22) Filed: Nov. 24, 2021

(65) Prior Publication Data

US 2022/0160465 A1 May 26, 2022

(30) Foreign Application Priority Data

Nov. 26, 2020 (JP) ................................ 2020-195972

(51) Int. Cl.
*A61C 5/40* (2017.01)

(52) U.S. Cl.
CPC ..................................... *A61C 5/40* (2017.02)

(58) Field of Classification Search
CPC .... A61C 5/40; A61C 5/42; A61C 5/44; A61C 19/05; A61C 19/043; A61C 19/042; A61C 19/04; A61N 1/06; A61N 1/3605
See application file for complete search history.

(56) References Cited

U.S. PATENT DOCUMENTS 1,713,971 A * 5/1929 Lowry ..................... A61C 5/40 606/49
5,152,762 A * 10/1992 McElhenney ...... A61B 18/1233 606/35
5,737,483 A * 4/1998 Inaji ........................ H02P 23/16 388/906

(Continued)

FOREIGN PATENT DOCUMENTS

CN 102271612 A 12/2011
CN 107072705 A 8/2017

(Continued)

OTHER PUBLICATIONS

Combined Chinese Office Action and Search Report issued Feb. 20, 2024 in Chinese Patent Application No. 2021111397608.9 (with unedited computer-generated English translation), 16 pages.

(Continued)

*Primary Examiner* — Heidi M Eide
*Assistant Examiner* — Lina Faraj
(74) *Attorney, Agent, or Firm* — Oblon, McClelland, Maier & Neustadt, L.L.P.

(57) ABSTRACT

A dental treatment apparatus includes a holder, a high-frequency signal generation circuit, a detector, and a control circuit. The holder holds an electrode placed at a dental treatment site. A power supply energizes the electrode with a high-frequency current. A detector detects a current value which energizes the electrode. A control circuit causes, based on the current value detected by detector, the power supply to control a current value of the high-frequency current which energizes the electrode.

12 Claims, 9 Drawing Sheets

(56) References Cited

U.S. PATENT DOCUMENTS

| | | | | |
|---|---|---|---|---|
| 5,931,836 | A * | 8/1999 | Hatta | A61B 18/1206<br>606/45 |
| 6,074,386 | A * | 6/2000 | Goble | A61B 18/1402<br>606/42 |
| 9,827,069 | B2 * | 11/2017 | Kunisada | A61C 5/40 |
| 10,327,840 | B2 * | 6/2019 | Ellman | A61B 18/1402 |
| 11,464,602 | B2 * | 10/2022 | Pedulla | H02P 29/40 |
| 2002/0055085 | A1 * | 5/2002 | Perdomini | A61B 18/1206<br>433/215 |
| 2006/0269900 | A1 * | 11/2006 | Paschke | A61C 1/0015<br>433/119 |
| 2008/0103495 | A1 * | 5/2008 | Mihori | A61B 18/1206<br>606/38 |
| 2010/0209867 | A1 | 8/2010 | Becker et al. | |
| 2011/0003226 | A1 | 1/2011 | Markoski et al. | |
| 2011/0039226 | A1 | 2/2011 | Armanino | |
| 2012/0322027 | A1 | 12/2012 | Laxhuber | |
| 2016/0022349 | A1 | 1/2016 | Woloszko et al. | |
| 2016/0287317 | A1 * | 10/2016 | Tsubuku | A61B 18/1445 |
| 2017/0216579 | A1 * | 8/2017 | Becker | A61C 5/44 |

FOREIGN PATENT DOCUMENTS

| | | | | |
|---|---|---|---|---|
| EP | 2 080 482 | A1 | 7/2009 | |
| EP | 2 345 388 | A1 | 7/2011 | |
| JP | 4-30509 | U | 3/1992 | |
| JP | 2000-245744 | A | 9/2000 | |
| JP | 2000-515398 | A | 11/2000 | |
| JP | 2004-195192 | A | 7/2004 | |
| JP | 2007-229110 | A | 9/2007 | |
| JP | 4041165 | B2 | 1/2008 | |
| JP | 2011-193907 | A | 10/2011 | |
| JP | 2012-507385 | A | 3/2012 | |
| WO | WO97/46170 | A1 | 12/1997 | |
| WO | WO 2008/053532 | A1 | 5/2008 | |
| WO | WO-2008114244 | A1 * | 9/2008 | A61B 18/14 |
| WO | WO 2010/052717 | A1 | 5/2010 | |
| WO | WO 2015/122307 | A1 | 8/2015 | |

OTHER PUBLICATIONS

European Office Action issued on Jun. 16, 2023 in European Patent Application No. 21 210 489.7, 6 pages.

Notice of Reasons for Refusal issued Jan. 31, 2023 in Japanese Patent Application No. 2020-195972 (with English machine translation), 6 pages.

Extended European Search Report issued on Apr. 4, 2022, in European Patent Application No. 21210489.7, 6 pages.

Fukushima, “Knowing Bacteria: Changing the End”, Eisue Shoten, Jun. 1, 1999, pp. 142-150 (8 total pages).

Ono, “The whole thing is consent! Electric scalpel safety handbook . . . ”, Clinical Engineering, Gakken Medical Shujunsha Publishing, Sep. 30, 2015, pp. 30-35.

Sakuragi, “Easy-to-understand electric scalpel book—Know your weapon!”, Kanehara Publishing Co. Ltd., Mar. 31, 2014, pp. 86-93.

Information Offer Form and Notice of Submission of Publications issued on Jul. 11, 2023 in Japanese Patent Application No. 2020-195972 (with English translation), 26 pages.

Notice of Reasons for Refusal issued on Jul. 25, 2023 in Japanese Patent Application No. 2020-195972 (with English translation), 8 pages.

Bando, et al. “Application of electro-magnetic wave irradiation for endodontic treatment-EMAT (electro-magnetic apical treatment)”, The Journal of Japan Endodontic Association, vol. 32, 2011, pp. 184-200 (with English Abstract).

* cited by examiner 10
12
15
SETTING OPERATION UNIT
21
CONTROL CIRCUIT
16
FOOT SWITCH
14
DISPLAY
19
HIGH-FREQUENCY SIGNAL GENERATION CIRCUIT
23
ROOT CANAL LENGTH MEASUREMENT CIRCUIT
20
DETECTOR
SW1
SW2
22
904
13
11
900
901
903
902

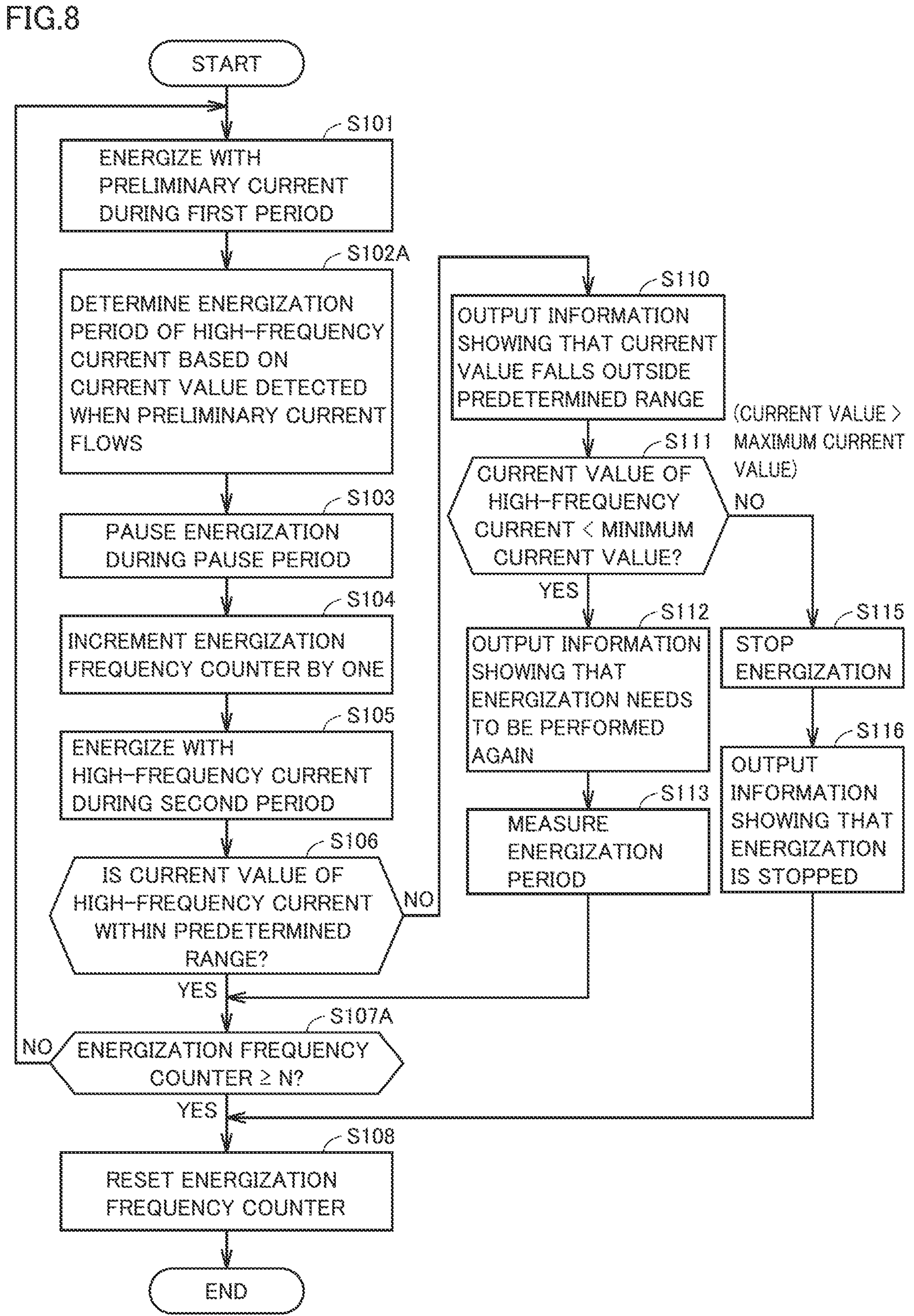
FIG.8
START
S101
ENERGIZE WITH PRELIMINARY CURRENT DURING FIRST PERIOD
S102A
DETERMINE ENERGIZATION PERIOD OF HIGH-FREQUENCY CURRENT BASED ON CURRENT VALUE DETECTED WHEN PRELIMINARY CURRENT FLOWS
S103
PAUSE ENERGIZATION DURING PAUSE PERIOD
S104
INCREMENT ENERGIZATION FREQUENCY COUNTER BY ONE
S105
ENERGIZE WITH HIGH-FREQUENCY CURRENT DURING SECOND PERIOD
S106
IS CURRENT VALUE OF HIGH-FREQUENCY CURRENT WITHIN PREDETERMINED RANGE?
NO
YES
S107A
ENERGIZATION FREQUENCY COUNTER ≥ N?
NO
YES
S108
RESET ENERGIZATION FREQUENCY COUNTER
END
S110
OUTPUT INFORMATION SHOWING THAT CURRENT VALUE FALLS OUTSIDE PREDETERMINED RANGE
S111
CURRENT VALUE OF HIGH-FREQUENCY CURRENT < MINIMUM CURRENT VALUE?
(CURRENT VALUE > MAXIMUM CURRENT VALUE)
NO
YES
S112
OUTPUT INFORMATION SHOWING THAT ENERGIZATION NEEDS TO BE PERFORMED AGAIN
S113
MEASURE ENERGIZATION PERIOD
S115
STOP ENERGIZATION
S116
OUTPUT INFORMATION SHOWING THAT ENERGIZATION IS STOPPED

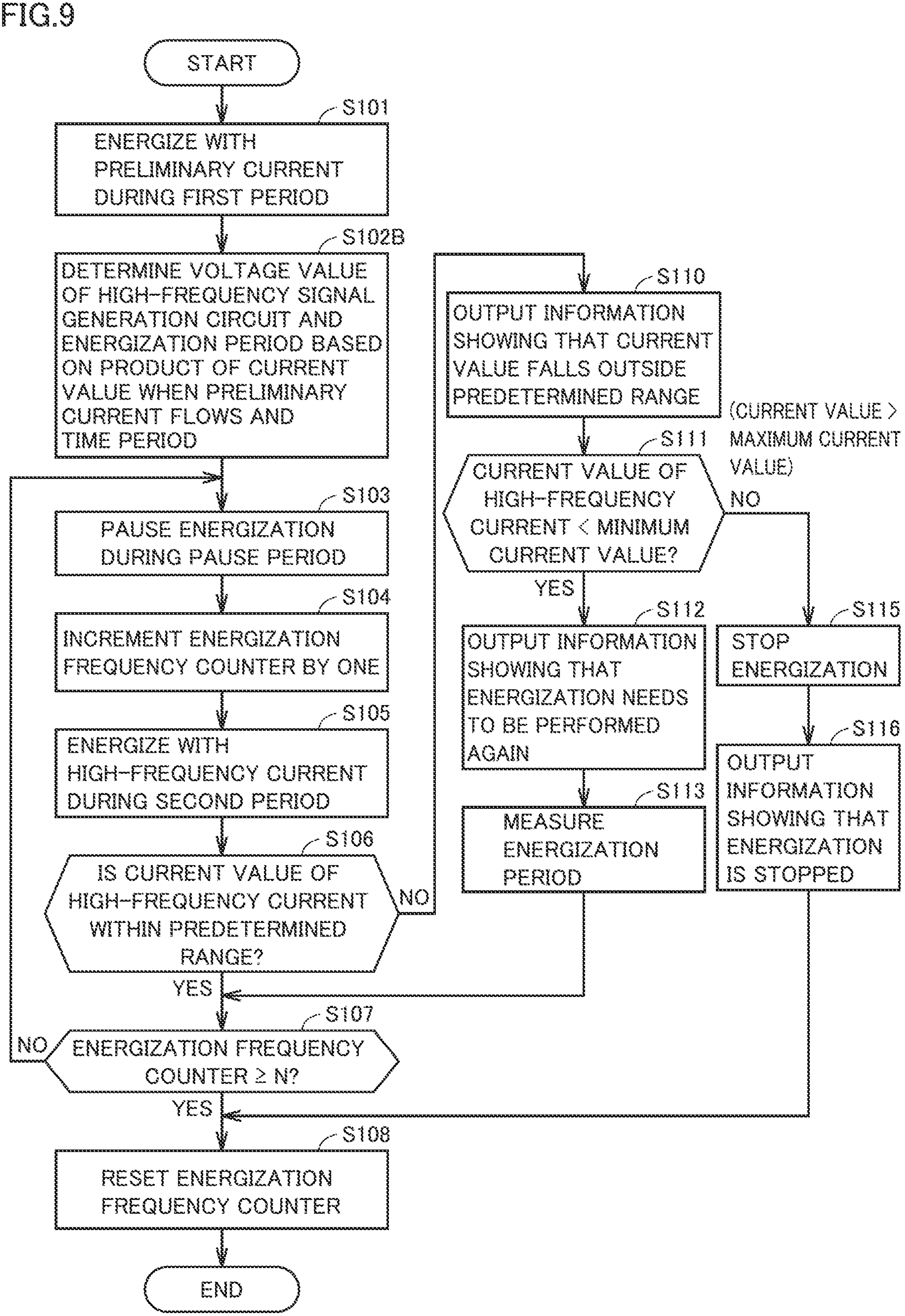
FIG.9
START
S101
ENERGIZE WITH PRELIMINARY CURRENT DURING FIRST PERIOD
S102B
DETERMINE VOLTAGE VALUE OF HIGH-FREQUENCY SIGNAL GENERATION CIRCUIT AND ENERGIZATION PERIOD BASED ON PRODUCT OF CURRENT VALUE WHEN PRELIMINARY CURRENT FLOWS AND TIME PERIOD
S103
PAUSE ENERGIZATION DURING PAUSE PERIOD
S104
INCREMENT ENERGIZATION FREQUENCY COUNTER BY ONE
S105
ENERGIZE WITH HIGH-FREQUENCY CURRENT DURING SECOND PERIOD
S106
IS CURRENT VALUE OF HIGH-FREQUENCY CURRENT WITHIN PREDETERMINED RANGE?
NO
YES
S107
ENERGIZATION FREQUENCY COUNTER ≥ N?
NO
YES
S108
RESET ENERGIZATION FREQUENCY COUNTER
END
S110
OUTPUT INFORMATION SHOWING THAT CURRENT VALUE FALLS OUTSIDE PREDETERMINED RANGE
S111
CURRENT VALUE OF HIGH-FREQUENCY CURRENT < MINIMUM CURRENT VALUE?
(CURRENT VALUE > MAXIMUM CURRENT VALUE)
NO
YES
S112
OUTPUT INFORMATION SHOWING THAT ENERGIZATION NEEDS TO BE PERFORMED AGAIN
S113
MEASURE ENERGIZATION PERIOD
S115
STOP ENERGIZATION
S116
OUTPUT INFORMATION SHOWING THAT ENERGIZATION IS STOPPED

DENTAL TREATMENT APPARATUS AND METHOD FOR CONTROLLING DENTAL TREATMENT APPARATUS

CROSS-REFERENCE TO RELATED APPLICATIONS

This application claims priority under 35 U.S.C. § 119 from Japanese Patent Application No. 2020-195972, filed Nov. 26, 2020. The entire content of the above application is incorporated herein by reference.

BACKGROUND

Field

The present disclosure relates to a dental treatment apparatus that energizes a dental treatment site with a high-frequency current, and a method for controlling a dental treatment apparatus.

Description of the Background Art

In the dental field, root canal treatment for teeth may be performed to remove dental pulp or to mitigate inflammation at a root apex. In such a root canal treatment, a root canal is cut and widened with a reamer and a file, contaminated tissue or contaminants in the root canal are removed, and then the root canal is filled with a medicament.

The root canal, however, has a complex shape, and the shape differs from tooth type to tooth type and from person to person. It is therefore difficult for the root canal treatment to widen some portion of the root canal even with a reamer and a file, which may cause an inflammation factor to remain such that the root canal cannot be widened and that inflammation occurs after the treatment.

Japanese Patent No. 4041165 discloses dental medical equipment that applies high-frequency electron pulses to the inside of a root canal. Such medical equipment applies, when a needle-shaped electrode (for example, a file) is inserted into a root canal, and a distal end of the needle reaches a root apex, the high-frequency electron pulses to cauterize dental pulp and the like.

Further, WO 2008/114244 A discloses a dental treatment apparatus that performs root canal treatment for reducing an inflammation factor, bacteria, and the like in the root canal of a tooth. In such a dental treatment apparatus, a dental instrument capable of communicating with a measuring instrument that measures the position of the root apex includes an electrode to be inserted into the root canal. The dental instrument is further capable of communicating with a unit that applies electric pulses. This allows the dental treatment apparatus to apply electric pulses to the root canal through the electrode inserted into the root canal to reduce an inflammation factor, bacteria, and the like in the root canal with the help of the application of electric pulses.

SUMMARY

The electrode inserted into the root canal, however, may have an insulating film formed on a surface of the electrode due to energization with a current. When the insulating film is formed on the surface of the electrode, a resistance value of the electrode increases, and a current value flowing through the electrode decreases, so that a current value necessary for the root canal treatment to reduce an inflammation factor, bacteria, and the like in the root canal cannot be obtained.

Furthermore, blood, protein, or the like may adhere to and coagulate on the electrode inserted into the root canal. When blood, protein, or the like adheres to and coagulates on the electrode, the resistance value of the electrode increases, and the current value flowing through the electrode decreases, so that the current value necessary for the root canal treatment to reduce an inflammation factor, bacteria, and the like in the root canal cannot be obtained. Further, the root canal varies in impedance in a manner that depends on the state of the root canal into which the electrode is inserted, so that a current value much greater than the current value necessary for the root canal treatment may flow, or a current value less than the current value necessary for the root canal treatment may flow.

The present disclosure solves, at least, the above-described problems, and it is therefore an object of the present disclosure to provide a dental treatment apparatus and a method for controlling the dental treatment apparatus capable of energizing an electrode inserted into a root canal with a high-frequency current having a current value necessary for root canal treatment to reduce an inflammation factor, bacteria, and the like in the root canal even under various changing situations.

A dental treatment apparatus according to the present disclosure energizes a dental treatment site with a high-frequency current. The dental treatment apparatus includes a holder, a power supply, a detector, and a controller. The holder holds an electrode placed at the dental treatment site. The power supply energizes the electrode with the high-frequency current. The detector detects a current value with which the electrode is energized by the power supply. The controller causes, based on the current value detected by the detector, the power supply to control the current value of the high-frequency current with which the electrode is energized.

A dental treatment apparatus according to another aspect of the present disclosure energizes a dental treatment site with a high-frequency current. The dental treatment apparatus includes a holder and a power supply. The holder holds an electrode placed at the dental treatment site. The power supply energizes the electrode with the high-frequency current through under constant current drive.

A dental treatment apparatus according to still another aspect of the present disclosure energizes a dental treatment site with a high-frequency current. The dental treatment apparatus includes a holder, a power supply, a detector, and a controller. The holder holds an electrode placed at the dental treatment site. The power supply energizes the electrode with the high-frequency current. The detector detects a current value of the high-frequency current with which the electrode is energized by the power supply. The controller causes the power supply to control at least either the current value of the high-frequency current with which the electrode is energized or a time period where the electrode is energized with the high-frequency current so as to bring a product of the current value of the high-frequency current detected by the detector and a time period where the energization with the high-frequency current is performed within a predetermined range.

A method for controlling a dental treatment apparatus according to yet another aspect of the present disclosure is a method for controlling a dental treatment apparatus including a holder to hold an electrode placed at a dental treatment site, a power supply to energize the electrode with a high-frequency current, a detector to detect a current value with which the electrode is energized by the power supply, and a controller to cause the power supply to control a current value of the high-frequency current with which the electrode is energized. The method for controlling a dental treatment apparatus includes detecting, by the detector, a current value with which the electrode is energized by the power supply, and causing, by the controller, the power supply to control the current value of the high-frequency current with which the electrode is energized so as to bring the current value detected by the detector within a predetermined range.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a diagram for schematically describing a root canal of a tooth.

FIG. 8 is a flowchart for describing control of the dental treatment apparatus according to the second embodiment.

FIG. 9 is a flowchart for describing control of a dental treatment apparatus according to a third embodiment.

DETAILED DESCRIPTION

Hereinafter, embodiments according to the present disclosure will be described with reference to the drawings.

First Embodiment

Figure 1:
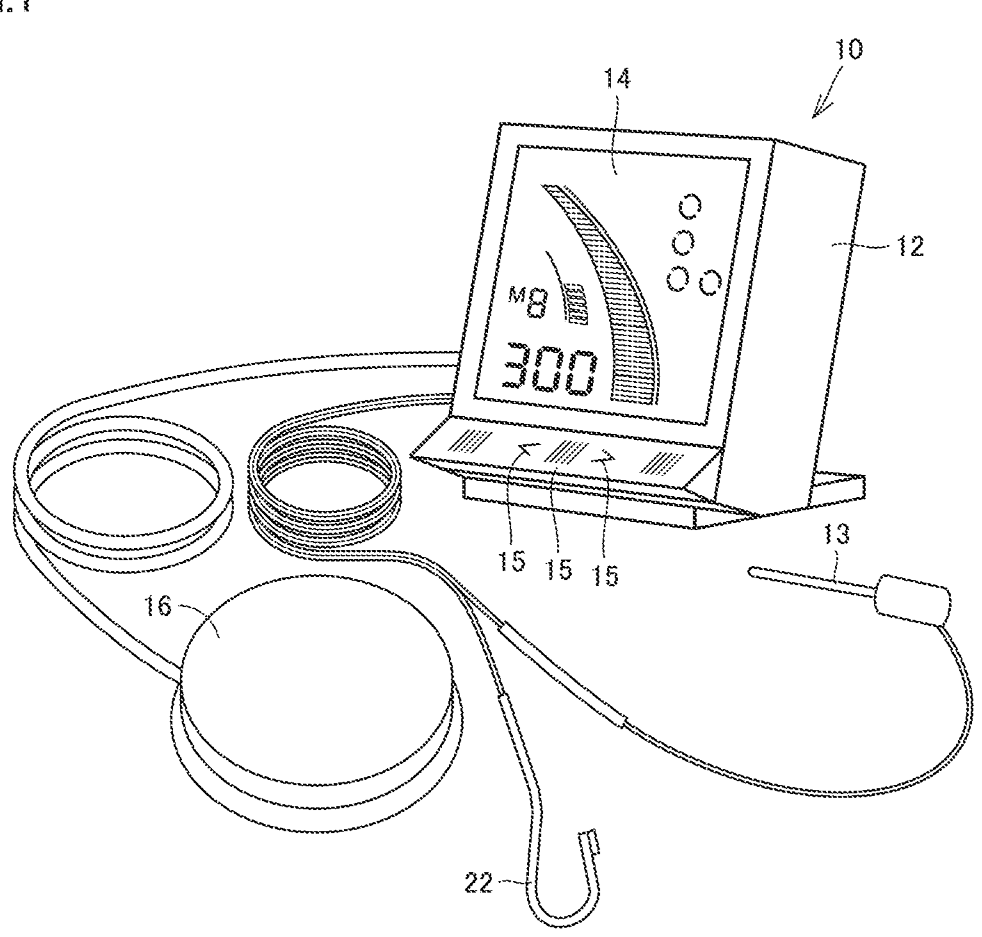
FIG. 1 is an external view of a dental treatment apparatus according to a first embodiment.
Figure 2:
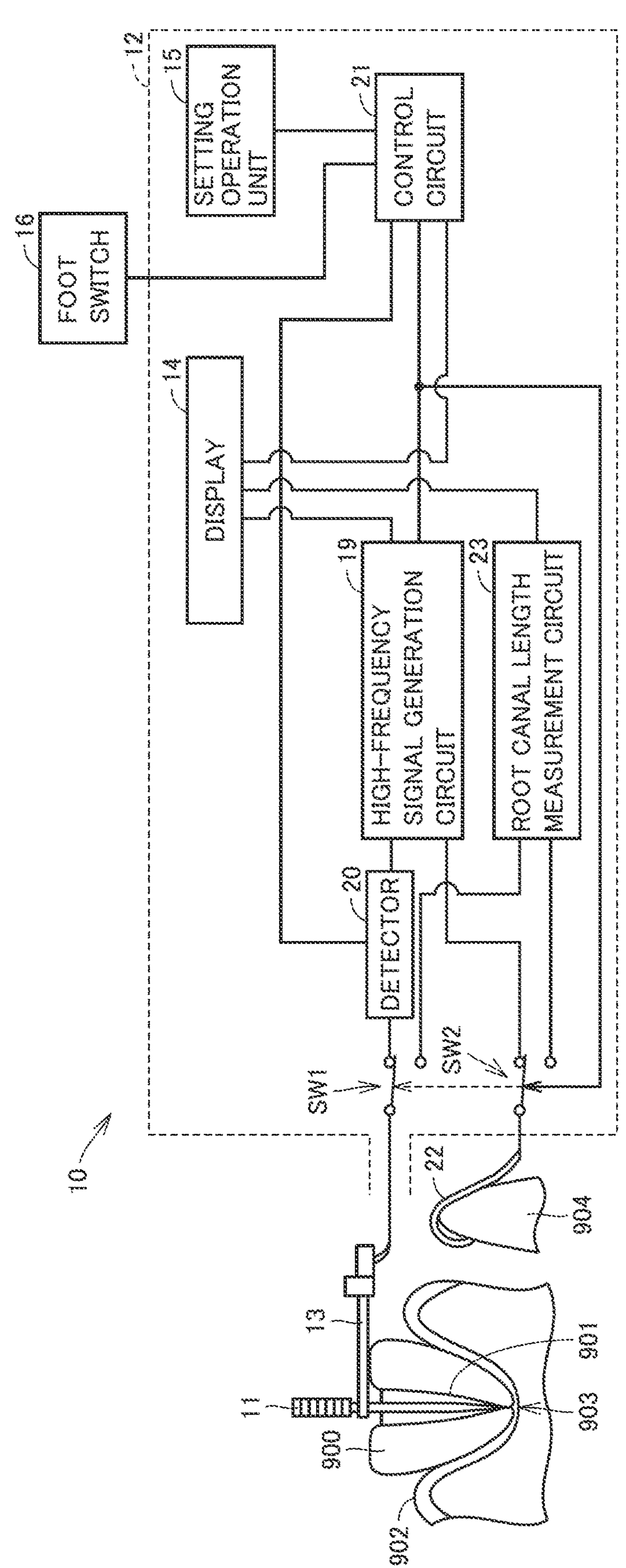
FIG. 2 is a block diagram of a configuration of the dental treatment apparatus according to the first embodiment.
Figure 3:
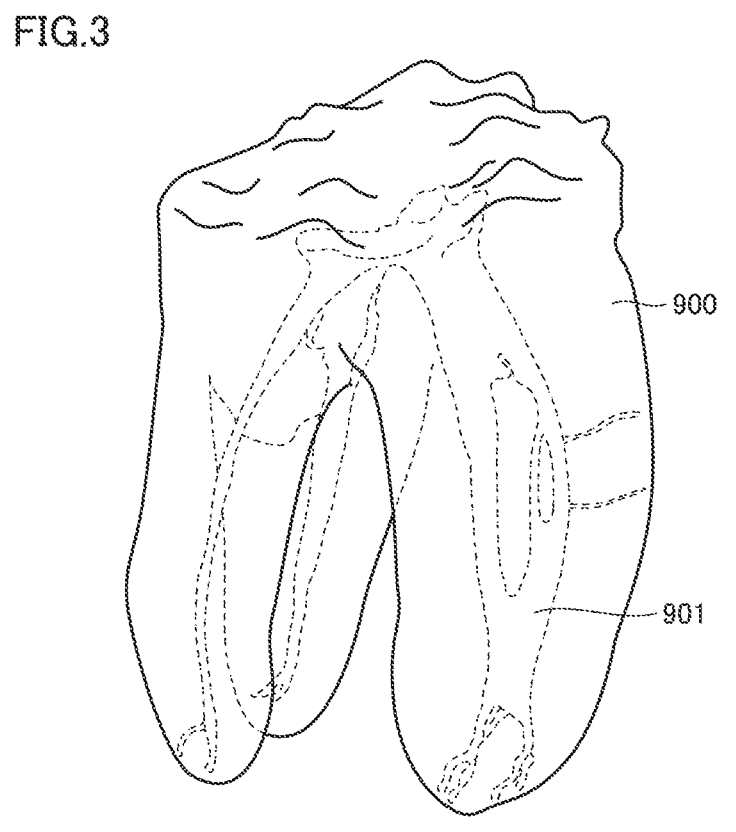

FIG. 1 is an external view of a dental treatment apparatus according to a first embodiment. FIG. 2 is a block diagram of a configuration of the dental treatment apparatus according to the first embodiment. FIG. 3 is a diagram for schematically describing a root canal of a tooth. Root canal treatment of cutting and widening a root canal of a tooth is very difficult treatment because a degree to which a root canal is curved or a degree to which a root canal is calcified and blocked, and the like are different among individuals. A tooth 900 shown in FIG. 3 is a molar tooth, and each tooth includes a plurality of root canals 901. It is difficult to perform treatment on all such complex-shaped root canals. In particular, when there is a portion where it is difficult to cut and widen a root canal using cutting tools such as a reamer and a file, the root canal in the portion cannot be cut and widened, and dental pulp or an inflammation factor remains in the root canal, inflammation may occur after treatment.

Therefore, the dental treatment apparatus performs treatment in which an electrode is inserted into a root canal, and the electrode is energized with a high-frequency current. During this treatment, a human body, particularly a tooth, more particularly a root canal, a periodontal tissue, or a bone is energized with the high-frequency current, so that the energized portion, particularly a portion near the electrode and a portion having a high current density, is cauterized by Joule heat generated by the high-frequency current, reducing an inflammation factor, bacteria, and the like. Note that complete sterilization need not be achieved by this treatment, and it is sufficient that dental pulp or granulation can be thermally denatured to cause necrosis or deactivation. Further, this treatment is also referred to as electro-magnetic apical treatment (EMAT) and is disclosed in the literature (for example, Naoki Bando, Toshihiko Tominaga, Hiromichi Yumoto, Takashi Sumitomo, Saki Hirao, Koji Hirao, Takashi Matsuo, "Application of electro-magnetic wave irradiation for endodontic treatment-EMAT (electro-magnetic apical treatment)", 2011, The Journal of Japan Endodontic Association, vol. 32, pp. 184-200) and the like. This disclosure has reported that prognosis is extremely good because it is possible to reduce an inflammation factor, bacteria, and the like at the dental treatment site by energizing, with a high-frequency current, an affected part before and after treatment.

The electrode inserted into the root canal, however, may have an insulating film formed on a surface of the electrode due to energization with a current. In particular, when sparks are produced from the electrode during the energization with the high-frequency current, it is highly likely that the surface of the electrode is denatured, and this denaturation of the surface of the electrode not only changes the conductivity of the electrode, but also forms an insulating film on the surface of the electrode. When the insulating film is formed on the surface of the electrode, a resistance value of the electrode increases, a current value flowing through the electrode decreases, and a current value necessary for the root canal treatment to reduce an inflammation factor, bacteria, and the like in the root canal cannot be obtained, so that an expected treatment effect may not be obtained. Here, the current value necessary for the root canal treatment to reduce an inflammation factor, bacteria, and the like in the root canal is a current value at which the expected treatment effect can be obtained by energizing, with the high-frequency current, the electrode placed at the dental treatment site, and there is a possibility that a sufficient treatment effect cannot be obtained with a small current value, and conversely, periodontal tissue and the like may be damaged with a large current value.

Furthermore, blood, protein, or the like may adhere to and coagulate on the electrode inserted into the root canal. When blood, protein, or the like adheres to and coagulates on the electrode, the resistance value of the electrode increases, the current value flowing through the electrode decreases, and the current value necessary for the root canal treatment cannot be obtained, so that the expected treatment effect cannot be obtained. Further, the root canal varies in impedance in a manner that depends on the state of the root canal into which the electrode is inserted, so that a current value greater than the current value necessary for the root canal treatment may flow, or only a current value less than the current value necessary for the root canal treatment may flow. For example, when an apical foramen is large, the root canal is filled with a conductive medical fluid, or foreign matter in the root canal burns off due to the high-frequency current, the impedance of the root canal decreases, so that a current having a current value greater than the current value necessary for the root canal treatment flows. Further, in general, the more the periodontal tissue dries, the larger the impedance, so that only a current value less than the current value necessary for the root canal treatment can flow.

Therefore, a dental treatment apparatus 10 according to the first embodiment is capable of energizing an electrode inserted into a root canal with a high-frequency current having a current value necessary for root canal treatment to reduce an inflammation factor, bacteria, and the like in the root canal even under various changing situations. Specifically, as shown in FIG. 1, dental treatment apparatus 10 includes an energizing unit 12 that energizes, with a high-frequency current, a file 11 (see FIG. 2) that is a cutting tool, and a file holder 13 that holds file 11 and is capable of energizing, with the high-frequency current, to file 11 attached to a distal end of file holder 13. Note that, in the present disclosure, file 11 attached to the distal end of file holder 13 and serving as an electrode to be placed at a dental treatment site will be described, but file holder 13 and file 11 may be integrated into a single unit.

File holder 13 is made of a substantially rod-shaped housing and is capable of holding a metal portion of file 11. File holder 13 can electrically connect the file and energizing unit 12 by holding the metal portion of file 11. Energizing unit 12 includes a display 14 and a setting operation unit 15 and is connected with a foot switch 16 and a passive electrode 22.

As shown in FIG. 2, energizing unit 12 includes a high-frequency signal generation circuit 19, a detector 20, a control circuit 21, a root canal length measurement circuit 23, and switches SW1, SW2 in addition to display 14 and setting operation unit 15.

Setting operation unit 15 includes setting buttons provided for setting how dental treatment apparatus 10 operates. Setting operation unit 15 allows a current value, frequency, energization period of the high-frequency current with which file 11 is energized, a display setting of display 14, and the like to be set. Here, the energization period corresponds to a single energization period when the energization with the high-frequency current is performed one time in response to each operation and further corresponds to, when the energization with the high-frequency current is divided into a plurality of times and performed in response to each operation, the sum total of periods where the energization is divided into a plurality of times and performed.

Foot switch 16 is an operation unit provided to control the energization with the high-frequency current, and a control signal is transmitted from control circuit 21 to high-frequency signal generation circuit 19 when a user steps on foot switch 16. High-frequency signal generation circuit 19 energizes file 11 with the high-frequency current set via setting operation unit 15 based on the control signal received.

High-frequency signal generation circuit 19 passes the high-frequency current having, for example, a frequency of 300 kHz to 1000 kHz and a current value of 20 mA to 200 mA (a range of current values necessary for root canal treatment to reduce an inflammation factor, bacteria, and the like in the root canal) across file 11 and passive electrode 22. It goes without saying that the high-frequency current that can be generated by high-frequency signal generation circuit 19 is not limited to having the frequency and the current value described above. The current value, frequency, energization period, and the like of the high-frequency current output from high-frequency signal generation circuit 19 can be set by operation of setting operation unit 15. Control circuit 21 controls high-frequency signal generation circuit 19 based on the current value detected by detector 20 so as to allow high-frequency signal generation circuit 19 to output the high-frequency current having the current value set via setting operation unit 15. Note that, when the energization with the high-frequency current is performed, file 11 is inserted into root canal 901, the distal end of file 11 is brought into contact with, for example, a tissue near a root apex 903, and passive electrode 22 is brought into contact with a part of a patient's body such as a gum 902 or lip 904. When the current value is large, the passive electrode may have a rod shape or a plate shape with a large area so as to be actively held by the patient. That is, file holder 13 is a holder that holds file 11 serving as an electrode placed at the dental treatment site, and high-frequency signal generation circuit 19 is a power supply that energizes the electrode with the high-frequency current.

Detector 20 is a current detector that detects a current value actually flowing through file 11 when the energization of file 11 with the high-frequency current is performed by high-frequency signal generation circuit 19. Control circuit 21 causes, based on the current value detected by detector 20, high-frequency signal generation circuit 19 to control the current value of the high-frequency current with which file 11 is energized. Control circuit 21 includes, as hardware components, for example, a central processing unit (CPU), a storage that stores a program, data, and the like for causing the CPU to perform the processing, a random access memory (RAM) that serves as a work area of the CPU, a graphics processing unit (GPU) that primarily performs image processing, an input/output interface for maintaining consistency of signals exchanged with peripheral devices, and the like. The storage includes a storage device such as a non-volatile memory provided inside control circuit 21, a storage device connected over a network, or the like.

Root canal length measurement circuit 23 measures a position of the distal end of file 11 by applying a root canal length measurement signal across file 11 and passive electrode 22. Specifically, root canal length measurement circuit 23 applies voltages having two different frequencies across file 11 and passive electrode 22 to obtain respective impedance values, and determines the position of the distal end of file 11 relative to root apex 903 based on, for example, a difference or ratio between the two values (in practice, voltage or current values corresponding to the impedance values). Note that the method for measuring the root canal length is not limited to such a method, and various techniques including a measurement method proposed in the related art may be used. During the root canal length measurement, passive electrode 22 is also brought into contact with a part of the patient's body such as gum 902 or lip 904.

Switch SW1 is provided to switch the electrical connection between file 11 and high-frequency signal generation circuit 19 or root canal length measurement circuit 23. Switch SW2 is provided to switch the electrical connection between passive electrode 22 and high-frequency signal generation circuit 19 or root canal length measurement circuit 23.

Switch SW1 and switch SW2 are changes in position by control circuit 21 based on information input from setting operation unit 15. Specifically, in order to energize file 11 with the high-frequency current, control circuit 21 controls switch SW1 and switch SW2 to connect file 11 and passive electrode 22 to high-frequency signal generation circuit 19. In order to apply the root canal length measurement signal across file 11 and passive electrode 22, control circuit 21 controls switch SW1 and switch SW2 to connect file 11 and passive electrode 22 to root canal length measurement circuit 23. According to the first embodiment, switch SW1 and switch SW2 are controlled in accordance with an operation mode set via setting operation unit 15 to change connection destinations of file 11 and passive electrode 22. Note that switch SW1 and switch SW2 may be changed in position in synchronization with on/off operation of foot switch 16.

According to the first embodiment, high-frequency signal generation circuit 19 and root canal length measurement circuit 23 are electrically separated from each other by switch SW1 and switch SW2. Therefore, while high-frequency current is output to file 11, root canal length measurement circuit 23 is electrically disconnected from file 11 and passive electrode 22 by switch SW1 and switch SW2. This prevents root canal length measurement circuit 23 from being energized with the high-frequency current, so that it is possible to prevent root canal length measurement circuit 23 from failing due to the high-frequency current.

Further, according to the first embodiment, it is possible to determine where the position of the distal end of file 11 is located relative to the root apex by using root canal length measurement circuit 23. Therefore, the user can operate setting operation unit 15 to switch from a root canal length measurement mode to a high-frequency energization mode after confirming that the distal end of file 11 in the root canal has reached the position where the energization with the high-frequency current is performed by using root canal length measurement circuit 23. Therefore, dental treatment apparatus 10 can energize file 11 with the high-frequency current with the distal end of file 11 held at an appropriate position. It goes without saying that dental treatment apparatus 10 need not include root canal length measurement circuit 23 and only needs to have a capability of energizing file 11 with the high-frequency current, and may energize file 11 with the high-frequency current after confirming the position of the distal end of file 11 by using another root canal length measurement device.

Display 14 is, for example, a liquid crystal display and serves as a notification unit that displays the current value with which file 11 is energized by high-frequency signal generation circuit 19, the position of the distal end of file 11 measured by root canal length measurement circuit 23, and the like to notify the user of dental treatment apparatus 10 of necessary information. For example, when the current value detected by detector 20 falls outside the range of current values necessary for the root canal treatment to reduce an inflammation factor, bacteria, and the like in the root canal, display 14 may output information showing that the current value of the high-frequency current with which the energization is performed falls outside the range of current values necessary for the root canal treatment. Note that display 14 may include an organic EL display, electronic paper, a light emitting diode, or the like. Further, the notification unit may be a lamp, a speaker, or the like (not shown) rather than display 14, and may output the notification to the user by turning on the lamp or by emitting a beep from a speaker.

Figure 4:
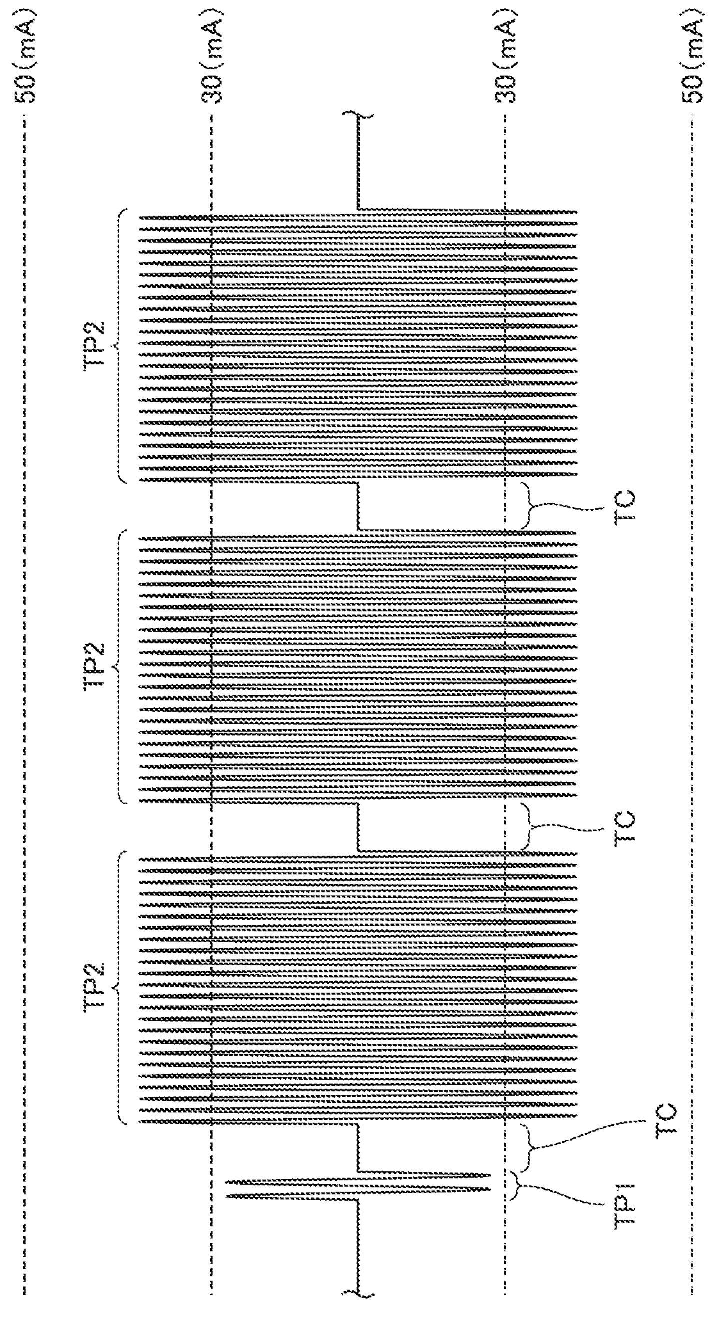
FIG. 4 is a diagram showing a waveform of a current with which an electrode of the dental treatment apparatus according to the first embodiment is energized.

Next, a description will be given of a waveform of the high-frequency current with which file 11 is energized by high-frequency signal generation circuit 19. FIG. 4 is a diagram showing a waveform of a current with which the electrode of the dental treatment apparatus according to the first embodiment is energized. The user determines the energization position of the high-frequency current based on root canal length measurement circuit 23, and operates foot switch 16 at the energization position to cause high-frequency signal generation circuit 19 to energize file 11 with the high-frequency current.

Before file 11 is fully energized with the high-frequency current, high-frequency signal generation circuit 19 preliminarily energizes file 11 with the high-frequency current. Energization during a first period (TP1) shown in FIG. 4 is preliminary energization, and energization during the subsequent second period (TP2) is full energization. Note that the diagram shown in FIG. 4 is a schematic representation, and a wavenumber shown in the diagram is different from the actual high-frequency wavenumber. Hereinafter, the same applies to a high-frequency waveform. The energization during the second period is performed with a high-frequency current within a range of current values (for example, 30 mA to 50 mA) necessary for the root canal treatment to reduce an inflammation factor, bacteria, and the like in the root canal, but on the other hand, the energization during the first period is performed with a preliminary current having a current value less than a minimum current value (for example, 30 mA) of the range of current values necessary for the root canal treatment, so that pain or the like caused by the energization during the first period can be reduced. A pause period (TC) shown in FIG. 4 is a period where the output during the second period (TP2) is calculated, but it is also possible to measure the position of file 11 in the root canal in this period. When the calculation time is extremely short, and the position in the root canal is not measured, the pause period (TC) between the first period (TP1) and the second period (TP2) is made extremely short.

Note that high-frequency signal generation circuit 19 includes a constant voltage circuit and energizes file 11 with the high-frequency current to under constant voltage control. Therefore, high-frequency signal generation circuit 19 applies, during the first period, a high-frequency voltage lower than a high-frequency voltage applied during the second period, so that a current value less than a current value with which energization is performed during the second period can be applied during the first period. It goes without saying that a difference need not be provided between the current value with which energization is performed during the first period and the current value with which energization is performed during the second period. Further, high-frequency signal generation circuit 19 may be a constant current circuit, and may energize file 11 with the high-frequency current under constant current control. When high-frequency signal generation circuit 19 includes a constant current circuit and energizes file 11 with the high-frequency current under constant current drive, control circuit 21 may cause high-frequency signal generation circuit 19 not to start or to stop the energization of file 11 with the high-frequency current when the voltage value of the output voltage of the constant current circuit becomes greater than or equal to a predetermined value. Further, when the voltage value of the output voltage of the constant current circuit becomes greater than or equal to the predetermined value, and the energization of file 11 with the high-frequency current by high-frequency signal generation circuit 19 is stopped, control circuit 21 may display, on display 14, information showing that the energization with the high-frequency current is stopped.

When it is assumed that a path extending from file 11 to passive electrode 22 has a normal impedance, control circuit 21 controls the voltage of high-frequency signal generation circuit 19 so as to energize file 11 with the current value of the preliminary current. Then, when a preliminary voltage is applied to cause high-frequency signal generation circuit 19 to energize file 11 with the preliminary current, and the impedance of the path extending from file 11 to passive electrode 22 changes from the normal impedance, the current value detected by detector 20 becomes different from an expected current value of the preliminary current. The impedance of the path extending from file 11 to passive electrode 22 varies in a manner that depends on the presence or absence of the insulating film formed on the surface of file 11, the presence or absence of adhesion of blood, protein, and the like to the surface of file 11, the impedance of the root canal, or the like.

Control circuit 21 performs control based on the current value detected by detector 20 when the preliminary current flows through file 11 so as to bring the current value of the high-frequency current flowing from high-frequency signal generation circuit 19 to file 11 for the energization during the second period within a predetermined range. In accordance with a difference or a ratio between the current value of the preliminary current and the current value detected by detector 20, control circuit 21 changes an optimum voltage at which the current value of the high-frequency current flowing through file 11 falls within the predetermined range and applies the optimum voltage thus changed to high-frequency signal generation circuit 19. That is, control circuit 21 optimizes the voltage applied to high-frequency signal generation circuit 19 so as to bring the current value of the high-frequency current flowing through file 11 within the predetermined range. Here, the predetermined range is a range of current values necessary for the root canal treatment to reduce an inflammation factor, bacteria, and the like in the root canal, and there are three possible ranges as the predetermined range according to symptoms: (1) greater than or equal to the predetermined value, (2) less than or equal to the predetermined value, and (3) greater than or equal to a first predetermined value and less than or equal to a second predetermined value (>the first predetermined value). In general, (3) greater than or equal to the first predetermined value and less than or equal to the second predetermined value (>the first predetermined value) is often used. Note that the current value of the high-frequency current flowing through file 11 is not limited to the current value necessary for the root canal treatment to reduce an inflammation factor, bacteria, and the like in the root canal. Further, as the method for optimizing the voltage applied to high-frequency signal generation circuit 19, control circuit 21 may simply select or calculate an output voltage that allows a current value within the predetermined range to be output from the value of the preliminary current, and, for example, another comparison method using, for example, a ratio may be performed.

High-frequency signal generation circuit 19 performs energization for, for example, 0.02 seconds (20 ms) as the first period, then pauses for, for example, 0.03 seconds (30 ms) as the pause period (TC), and performs energization for, for example, 0.07 seconds (70 ms) as the second period. High-frequency signal generation circuit 19 repeats the second period and the pause period (0.1 seconds (100 ms) in total) N times (for example, 10 times) for each energization (for example, each operation of foot switch 16). Dental treatment apparatus 10 causes, each time the user steps on foot switch 16, high-frequency signal generation circuit 19 to energize file 11 with the high-frequency current for about 1 second (including the pause period). Note that the number of repetitions of control of the pause period and the second period can be set in advance by the user using setting operation unit 15, and is set to, for example, 10 times according to the first embodiment. It goes without saying that the number of repetitions of control of the pause period and the second period may be set to a value other than 10 times. Further, in setting operation unit 15, instead of being set as the number of repetitions of control of the pause period and the second period, it may be set as the energization period (for example, 1 second). Note that the cumulative energization period of the high-frequency current is for example greater than or equal to 1 second. It goes without saying that it is not necessary to make the first pause period (TC) after the preliminary energization equal to the second and subsequent pause periods (TC).

Figure 5:
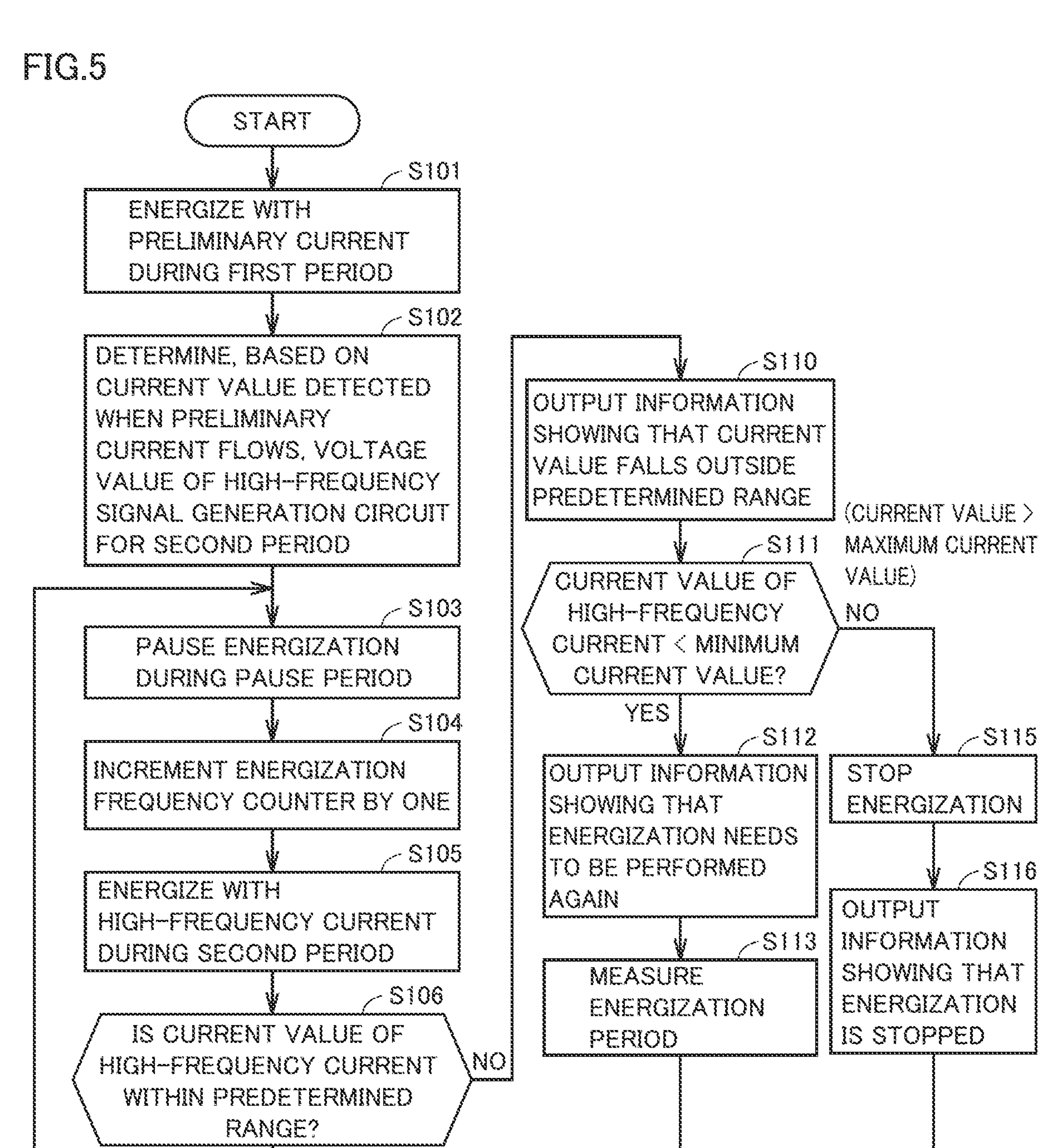
FIG. 5 is a flowchart for describing control of the dental treatment apparatus according to the first embodiment.

Next, a description will be given with reference to a flowchart of the control of the current value of the high-frequency current with which file 11 is energized in dental treatment apparatus 10. FIG. 5 is a flowchart for describing control of the dental treatment apparatus according to the first embodiment. First, when the user determines the energization position of the high-frequency current based on root canal length measurement circuit 23 and operates foot switch 16 at the energization position, control circuit 21 causes high-frequency signal generation circuit 19 to output the predetermined preliminary voltage to file 11 during the first period to perform energization with the preliminary current (step S101).

Next, control circuit 21 determines, based on the current value detected by detector 20 when the preliminary current flows through file 11, the voltage value of high-frequency signal generation circuit 19 for energizing file 11 with the current value of the high-frequency current that falls within the range (hereinafter, also referred to as a predetermined range) of current values necessary for the root canal treatment to reduce an inflammation factor, bacteria, and the like in the root canal (step S102). Specifically, control circuit 21 calculates the impedance of the root canal from the current value detected by detector 20 and a corresponding voltage value applied to high-frequency signal generation circuit 19, and determines the voltage value of high-frequency signal generation circuit 19 that brings the current value with which file 11 is energized with the root canal having the impedance within the predetermined range. After the elapse of the first period, control circuit 21 pauses the energization of file 11 by high-frequency signal generation circuit 19 during the pause period (step S103). Note that control circuit 21 may switch from the high-frequency energization mode to the root canal length measurement mode to measure the position of the distal end of file 11 during the pause period. That is, control circuit 21 may cause root canal length measurement circuit 23 to energize file 11 with a measurement signal during the pause period.

In order to count the frequency of energization with the high-frequency current during the second period, control circuit 21 increments an energization frequency counter by one (step S104). Control circuit 21 applies the voltage value determined in step S102 to high-frequency signal generation circuit 19 to cause high-frequency signal generation circuit 19 to energize file 11 with the current value within the predetermined range during the second period (step S105). Control circuit 21 determines whether the current value detected by detector 20 when the voltage value determined in step S102 is applied to high-frequency signal generation circuit 19 falls within the predetermined range (step S106).

When the detected current value falls within the predetermined range (YES in step S106), control circuit 21 determines whether the energization frequency counter is greater than or equal to N (for example, 10) (step S107). When the energization frequency counter is not greater than or equal to N (NO in step S107), control circuit 21 returns the processing to step S103 and repeats the control of the pause period and the second period. On the other hand, when the energization frequency counter is greater than or equal to N (YES in step S107), control circuit 21 resets the energization frequency counter to 0 (zero) (step S108) and stops the process of energizing file 11 with the high-frequency current.

Returning to step S106, when the detected current value falls outside the predetermined range (NO in step S106), control circuit 21 displays, on display 14, information showing that the current value of the high-frequency current with which energization is performed falls outside the predetermined range (step S110). Specifically, when foreign matter in the root canal comes off and the current value detected by detector 20 changes to 60 mA, 90 mA, and 80 mA, control circuit 21 may display a string "falls outside the predetermined range" on display 14 or change the background color of the screen to yellow. When a speaker is provided as the notification unit, the user may be notified, by a warning beep, of information showing that the current value of the high-frequency current with which energization is performed falls outside the predetermined range.

Next, even when the voltage value determined in step S102 is applied to high-frequency signal generation circuit 19, control circuit 21 determines whether the current value detected by detector 20 is less than the minimum current value of the predetermined range (step S111). When the detected current value is less than the minimum current value of the predetermined range (YES in step S111), control circuit 21 displays, on display 14, information showing that the process of energizing file 11 with the high-frequency current needs to be performed again (step S112). Specifically, control circuit 21 possibly displays a string "re-energization" on display 14, or causes the screen to blink with the background color set to yellow. When a speaker is provided as the notification unit, the user may be notified, by a warning beep, of information showing that energization needs to be performed again.

Further, control circuit 21 measures the energization period where the detected current value is less than the minimum current value of the predetermined range (step S113). In the flowchart shown in FIG. 5, the process of energizing file 11 with the high-frequency current is stopped when the control of the pause period and the second period has been repeated N times (for example, 10 times) rather than when the detected current value becomes less than the minimum current value of the predetermined range. Therefore, control circuit 21 can measure the energization period where the detected current value is less than the minimum current value of the predetermined range based on how many times the second period where the detected current value is less than the minimum current value has appeared among the repetitions N. In order to perform energization again, control circuit 21 may perform, by measuring the energization period where the detected current value is less than the minimum current value, the energization only during the period measured in step S113. It goes without saying that, when the process of energizing file 11 with the high-frequency current is stopped when the detected current value becomes less than the minimum current value of the predetermined range, control circuit 21 may execute step S108 after step S113. Here, the case where the detected current value can be determined to be less than the minimum current value of the predetermined range corresponds to a case where the environment in the root canal changes during energization, the impedance of the root canal increases, and a current value less than the minimum current value of the predetermined range flows accordingly.

Returning to step S111, when the detected current value is not less than the minimum current value of the predetermined range (NO in step S111), control circuit 21 can determine that the detected current value is greater than the maximum current value of the predetermined range, and thus stops the process of energizing file 11 with the high-frequency current (step S115). Note that control circuit 21 stops the energization when the current value detected after the start of the full energization becomes greater than the maximum current value of the predetermined range as in step S115, but does not start the full energization at all when the current value detected during the preliminary energization becomes greater than the maximum current value of the predetermined range. Control circuit 21 displays, on display 14, information showing that the process of energizing file 11 with the high-frequency current is stopped (step S116). Specifically, control circuit 21 possibly displays a string "stop" on display 14 or causes the screen to blink with the background color set to red. When a speaker is provided as the notification unit, the user may be notified, by a warning beep, of information showing that energization is stopped. Here, the case where the detected current value can be determined to be greater than the maximum current value of the predetermined range corresponds to a case where the environment in the root canal changes during energization, the impedance of the root canal decreases, and a current value greater than the minimum current value of the predetermined range flows accordingly.

In the example shown in FIGS. 4 and 5, the description has been given of the configuration where the voltage value of high-frequency signal generation circuit 19 is determined from the current value of the preliminary current detected during the first first period to bring the current value of the high-frequency current flowing during the subsequent N second periods within the predetermined range. Dental treatment apparatus 10, however, is not limited to the control shown in FIGS. 4 and 5 when file 11 is energized with the high-frequency current. For example, dental treatment apparatus 10 may perform control to provide the first period where the current value of the preliminary current is detected every time before the start of the energization during the second period. That is, control circuit 21 may perform feedback control on the current value with which energization is performed during the second period based on a result of detecting the preliminary current. When the current value of the high-frequency current is feedback-controlled during the energization period, and the current value detected by detector 20 changes and falls outside the predetermined range, control circuit 21 may display information showing that the current value falls outside the predetermined range on display 14. For example, when foreign matter in the root canal comes off and the current value detected by detector 20 changes to 60 mA, 90 mA, and 80 mA, display 14 outputs a warning display showing that the current value falls outside the predetermined range. Note that when the current value detected by detector 20 falls within the predetermined range but changes by at least a predetermined percentage (for example, about ±30%), information showing that the current value of the high-frequency current with which energization is performed changes abruptly may be displayed on display 14.

Figure 6:
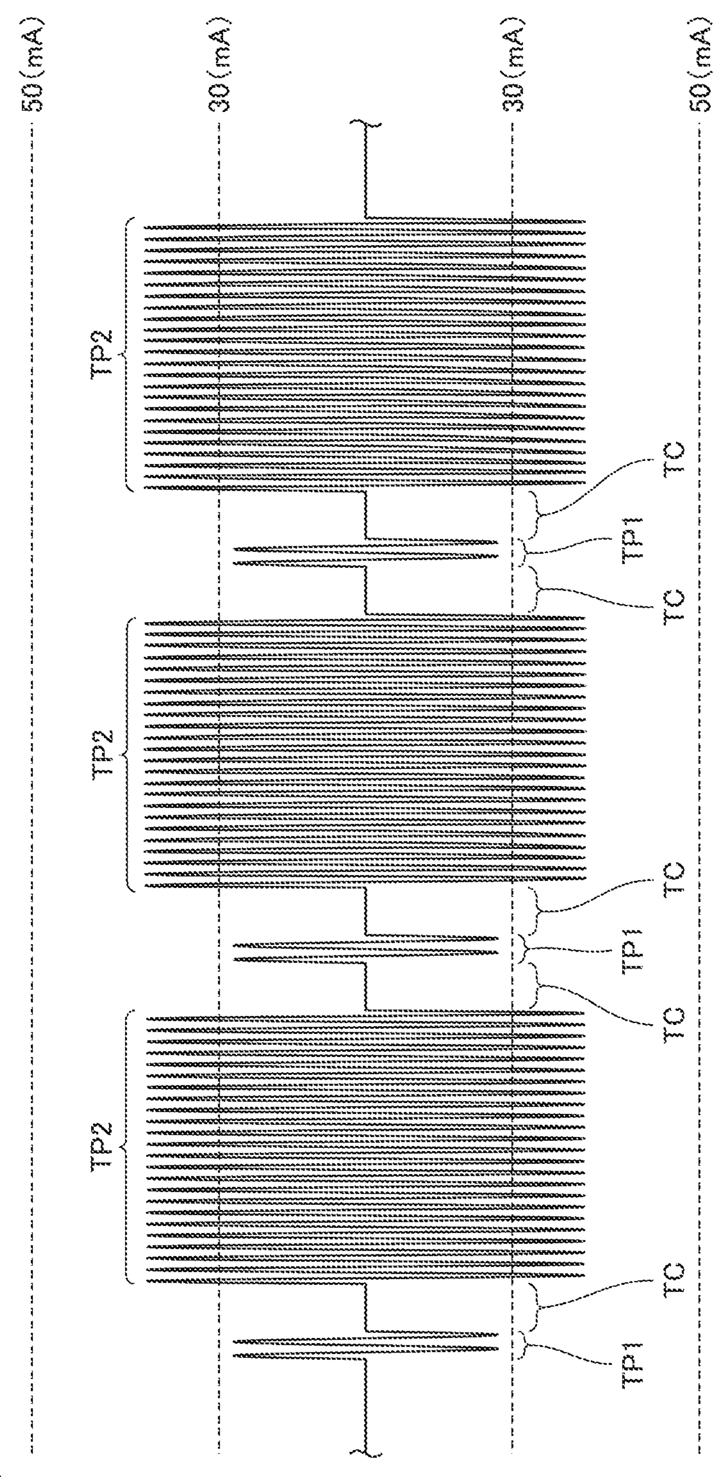
FIG. 6 is a diagram showing a waveform of a current with which an electrode of a dental treatment apparatus according to a modification of the first embodiment is energized.

FIG. 6 is a diagram showing a waveform of a current with which an electrode of a dental treatment apparatus according to a modification of the first embodiment is energized. In FIG. 6, a first period that is a preliminary energization period and a second period that is a full energization period are repeatedly provided. That is, dental treatment apparatus 10 performs control to provide the first period every time before the start of energization during the second period.

As shown in FIG. 6, dental treatment apparatus 10 determines every time, based on the current value of the preliminary current detected during the first period, the voltage value of high-frequency signal generation circuit 19 that brings the current value of the high-frequency current with which file 11 is energized during the second period within the predetermined range. Therefore, dental treatment apparatus 10 can control the current value in response to state changes of the path extending from file 11 to passive electrode 22. It goes without saying that, in this case, the pause periods (TC) before and after the first period (TP1) need not be the same period, and either or both of the pause periods (TC) may be 0 (zero). It goes without saying that the current value at the moment of output in the second period (TP2) may be detected, and the current value may be increased or decreased in accordance with the value.

As described above, dental treatment apparatus 10 according to the first embodiment is configured to energize the dental treatment site (for example, a root canal or the like) with the high-frequency current. Dental treatment apparatus 10 includes file holder 13 that holds file 11 placed at the dental treatment site, high-frequency signal generation circuit 19 that energizes file 11 with the high-frequency current, detector 20 that detects the current value with which file 11 is energized by high-frequency signal generation circuit 19, and control circuit 21 that causes, based on the current value detected by detector 20, high-frequency signal generation circuit 19 to control the current value of the high-frequency current with which file 11 is energized. Control circuit 21 causes, based on the current value detected by detector 20, high-frequency signal generation circuit 19 to bring the current value of the high-frequency current with which file 11 is energized within the predetermined range.

A method for controlling dental treatment apparatus 10 includes detecting, by detector 20, a current value with which file 11 is energized by high-frequency signal generation circuit 19, and controlling, by control circuit 21, the current value of the high-frequency current with which file 11 is energized by controlling the voltage value of high-frequency signal generation circuit 19 so as to bring the current value detected by detector 20 within the predetermined range.

With such a configuration, in dental treatment apparatus 10 and the method for controlling dental treatment apparatus 10 according to the first embodiment, high-frequency signal generation circuit 19 is caused to control the current value of the high-frequency current with which file 11 is energized based on the current value detected by detector 20, so that file 11 placed at the dental treatment site can be energized with the high-frequency current having the current value within the predetermined range even under various changing situations.

Further, control circuit 21 may cause high-frequency signal generation circuit 19 to energize file 11 with the preliminary current, and causes high-frequency signal generation circuit 19 to control the current value of the high-frequency current with which file 11 is energized based on the current value of the preliminary current detected by detector 20. This allows dental treatment apparatus 10 to set, while reducing damage to tissue due to the energization with the preliminary current, the high-frequency current with which the dental treatment site is energized to an optimum current value before file 11 is fully energized with the high-frequency current. It goes without saying that the current value during the second period may be detected, and the output voltage may be increased or decreased in accordance with to the detected current value. Note that the current value of the preliminary current may be less than the minimum current value of the predetermined range.

Furthermore, control circuit 21 may provide a pause period between the first period where file 11 is energized with the preliminary current by high-frequency signal generation circuit 19 and a second period where file 11 is energized with the high-frequency current by high-frequency signal generation circuit 19. This allows dental treatment apparatus 10 to measure the position of the distal end of file 11 during the pause period. Note that control circuit 21 may make the first period shorter than the second period. As a result, since the period where the energization with the preliminary current is performed is made shorter, dental treatment apparatus 10 can shorten a period where the high-frequency current with which the dental treatment site is energized is set to the optimum current value.

Further, control circuit 21 may cause high-frequency signal generation circuit 19 to repeatedly energize file 11 with the high-frequency current with the first period, the pause period, and the second period set as one period. This allows dental treatment apparatus 10 to set the optimum current value for each second period where file 11 is energized with the high-frequency current.

Furthermore, when detector 20 detects the current value of the preliminary current corresponding to a current value greater than the maximum current value of the predetermined range, control circuit 21 may causes high-frequency signal generation circuit 19 not to start or to stop the energization of file 11 with the high-frequency current. This allows dental treatment apparatus 10 to perform treatment without giving a burden or uncomfortable feeling to the patient.

Further, display 14 that notifies the user of information may be further provided, and control circuit 21 may cause display 14 to output the information showing that the current value of the high-frequency current with which energization is performed falls outside the predetermined range when the current value detected by detector 20 falls outside the predetermined range. This allows dental treatment apparatus 10 to appropriately notify the user of the state of the high-frequency current with which energization is performed.

Furthermore, when the current value of the preliminary current corresponding to a current value greater than the maximum current value of the predetermined range is detected by detector 20, and the energization of file 11 with the high-frequency current by high-frequency signal generation circuit 19 is stopped, control circuit 21 may cause display 14 to output information showing that the energization with the high-frequency current is stopped. This allows dental treatment apparatus 10 to cause the user to easily understand the cause of the stop of the energization with the high-frequency current.

Further, when the current value less than the minimum current value of the predetermined range is detected by detector 20, control circuit 21 may cause display 14 to output information showing that the energization with the high-frequency current needs to be performed again. This allows dental treatment apparatus 10 to notify the user of information showing that, for example, an inflammation factor, bacteria, and the like at the dental treatment site are not sufficiently reduced.

Further, control circuit 21 may measure a period where a current value less than the minimum current value of the predetermined range is detected by detector 20 and cause display 14 to output the measured period. This allows dental treatment apparatus 10 to notify the user of how long file 11 needs to be further energized with the high-frequency current to sufficiently reduce an inflammation factor, bacteria, and the like at the dental treatment site.

Second Embodiment

For the first embodiment, a description has been given of dental treatment apparatus 10 that controls, based on the current value of the preliminary current detected during the first period, the voltage value of high-frequency signal generation circuit 19 that brings the current value of the high-frequency current with which file 11 is energized during the second period within the predetermined range. For a dental treatment apparatus according to a second embodiment, a description will be given of a configuration where the energization period of the high-frequency current with which the file is energized during the second period based on the current value of the preliminary current detected during the first period. Note that, according to the second embodiment, the same components as the components of dental treatment apparatus 10 described according to the first embodiment are denoted by the same reference numerals, and no detailed description of such components will be given below. Further, the contents of the first embodiment described above can be combined with contents of the second embodiment to the extent consistent with the second embodiment.

Figure 7:
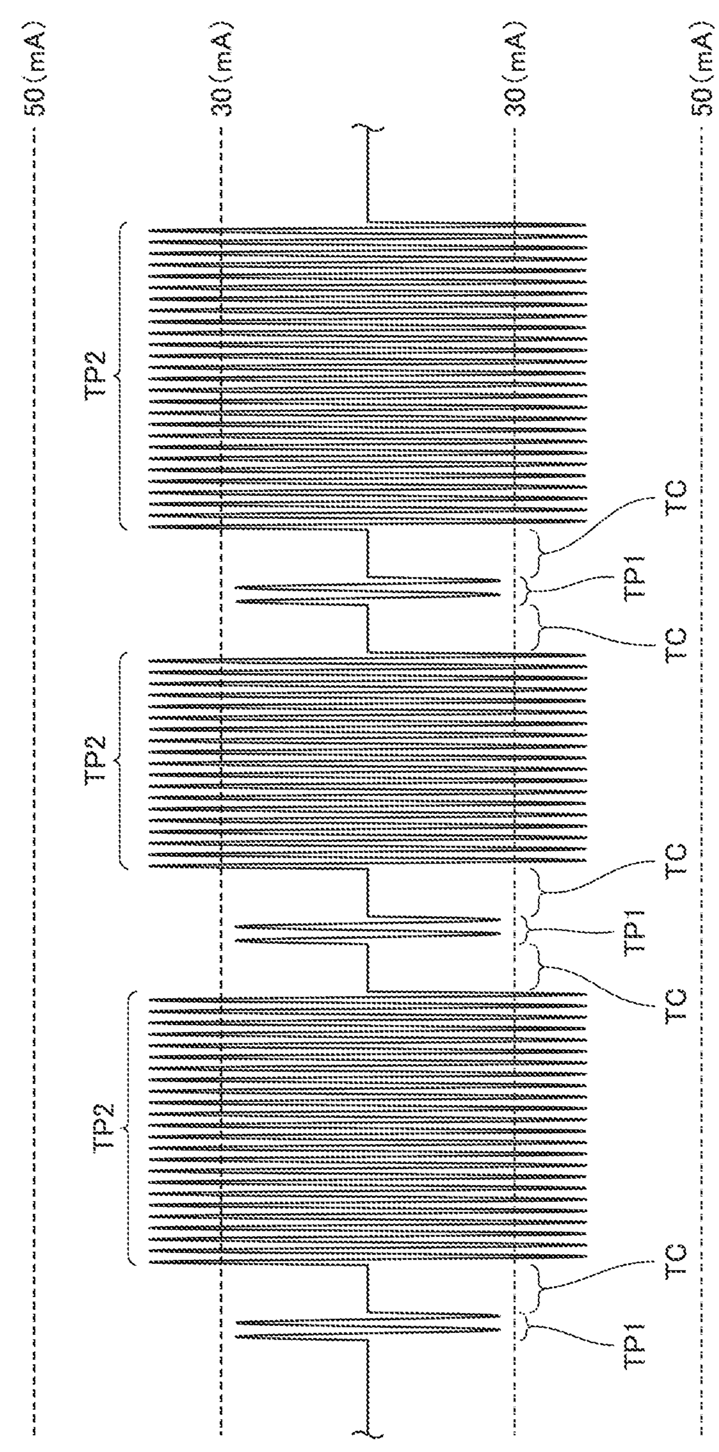
FIG. 7 is a diagram showing a waveform of a current with which an electrode of a dental treatment apparatus according to a second embodiment is energized.

FIG. 7 is a diagram showing a waveform of a current with which an electrode of the dental treatment apparatus according to the second embodiment is energized. In FIG. 7, a first period that is a preliminary energization period and a second period that is a full energization period are repeatedly provided. That is, dental treatment apparatus 10 performs control to provide the first period every time before the start of energization during the second period.

As shown in FIG. 7, dental treatment apparatus 10 determines the energization period of the high-frequency current with which file 11 is energized during the second period every time based on the current value of the preliminary current detected during the first period, so that the energization period of the high-frequency current differs among the first second period, the second second period, and the third second period. That is, in dental treatment apparatus 10, file 11 is energized with the high-frequency current having a waveform as shown in FIG. 7, so that it is possible to control the energization period (energization time) in response to state changes of the path extending from file 11 to passive electrode 22.

Next, a description will be given with reference to a flowchart of how to control the energization period of the high-frequency current with which file 11 is energized in dental treatment apparatus 10. FIG. 8 is a flowchart for describing control of the dental treatment apparatus according to the second embodiment. First, when the user determines the energization position of the high-frequency current based on root canal length measurement circuit 23 and operates foot switch 16 at the energization position, control circuit 21 causes high-frequency signal generation circuit 19 to energize file 11 with the preliminary current during the first period (step S101).

Next, control circuit 21 determines the energization period of the high-frequency current with which file 11 is energized based on the current value detected by detector 20 when the preliminary current flows through file 11 (step S102A). Specifically, for example, when the current value detected by detector 20 decreases by 20% relative to the current value flowing through file 11, control circuit 21 increases the energization period of the high-frequency current by 120%. After the elapse of the first period, control circuit 21 pauses the energization of file 11 by high-frequency signal generation circuit 19 during the pause period (step S103).

In order to count the frequency of energization with the high-frequency current during the second period, control circuit 21 increments an energization frequency counter by one (step S104). Control circuit 21 causes high-frequency signal generation circuit 19 to energize file 11 with the high-frequency current during the second period determined in step S102A (step S105). Control circuit 21 energizes file 11 with the high-frequency current and determines whether the current value detected by detector 20 falls within the predetermined range (step S106).

When the detected current value falls within the predetermined range (YES in step S106), control circuit 21 determines whether the energization frequency counter is greater than or equal to N (for example, 10) (step S107A). When the energization frequency counter is not greater than or equal to N (NO in step S107A), control circuit 21 returns the processing to step S101 and repeats the control of the first period, the pause period, and the second period. When returning the processing to step S101, control circuit 21 provides a pause period (not shown). Note that, as described in the first embodiment, when the energization frequency counter is not greater than or equal to N (NO in step S107A), control circuit 21 may return the processing to step S103 and repeat the control of the pause period and the second period. On the other hand, when the energization frequency counter is greater than or equal to N (YES in step S107A), control circuit 21 resets the energization frequency counter to 0 (zero) (step S108), and stops the process of energizing file 11 with the high-frequency current.

Returning to step S106, when the detected current value falls outside the predetermined range (NO in step S106), control circuit 21 displays, on display 14, information showing that the current value of the high-frequency current with which energization is performed falls outside the predetermined range (step S110).

Next, control circuit 21 energizes file 11 with the high-frequency current and determines whether the current value detected by detector 20 is less than the minimum current value of the predetermined range (step S111). When the detected current value is less than the minimum current value of the predetermined range (YES in step S111), control circuit 21 displays, on display 14, information showing that the process of energizing file 11 with the high-frequency current needs to be performed again (step S112).

Further, control circuit 21 measures the energization period where the detected current value is less than the minimum current value of the predetermined range (step S113).

Returning to step S111, when the detected current value is not less than the minimum current value of the predetermined range (NO in step S111), control circuit 21 can determine that the detected current value is greater than the maximum current value of the predetermined range, and thus stops the process of energizing file 11 with the high-frequency current (step S115). Control circuit 21 displays, on display 14, information showing that the process of energizing file 11 with the high-frequency current is stopped (step S116).

As described above, in dental treatment apparatus 10 according to the second embodiment, control circuit 21 causes high-frequency signal generation circuit 19 to control the period (time) where file 11 is energized with the high-frequency current having the current value within the predetermined range based on the current value detected by detector 20. With such a configuration, dental treatment apparatus 10 according to the second embodiment controls the energization period of the high-frequency current with which file 11 is energized based on the current value detected by detector 20, so that file 11 can be energized with the high-frequency current during the energization period appropriate to various changing situations.

Further, control circuit 21 may cause high-frequency signal generation circuit 19 to energize file 11 with the preliminary current, and causes high-frequency signal generation circuit 19 to control the period where file 11 is energized with the high-frequency current having the current value within the predetermined range based on the current value of the preliminary current detected by detector 20. This allows dental treatment apparatus 10 to set the optimum energization period of the high-frequency current with which the dental treatment site is energized before the start of energization of file 11 with the high-frequency current during the second period. It goes without saying that the current value during the second period may be detected, and the energization period may be increased or decreased in accordance with to the detected current value. Note that the current value of the preliminary current may be less than the minimum current value of the predetermined range.

Third Embodiment

For the first embodiment, a description has been given of dental treatment apparatus 10 that controls, based on the current value of the preliminary current detected during the first period, the voltage value of high-frequency signal generation circuit 19 that brings the current value of the high-frequency current with which file 11 is energized during the second period within the predetermined range. For a dental treatment apparatus according to a third embodiment, a description will be given of a configuration where at least either the current value or energization period of the high-frequency current with which the file is energized during the second period is controlled so as to bring a product of the current value of the preliminary current detected during the first period and the first period within a predetermined range. Note that, according to the third embodiment, the same components as the components of dental treatment apparatus 10 described according to the first embodiment are denoted by the same reference numerals, and no detailed description of such components will be given below. Further, the contents of the first embodiment described above can be combined with contents of the third embodiment to the extent consistent with the third embodiment.

Next, a description will be given with reference to a flowchart of control based on the product of the current value and energization period of the high-frequency current with which file 11 is energized in dental treatment apparatus 10. FIG. 9 is a flowchart for describing control of the dental treatment apparatus according to the third embodiment. First, when the user determines the energization position of the high-frequency current based on root canal length measurement circuit 23 and operates foot switch 16 at the energization position, control circuit 21 causes high-frequency signal generation circuit 19 to energize file 11 with the preliminary current during the first period (step S101).

Next, control circuit 21 determines the voltage value of high-frequency signal generation circuit 19 and the energization period for energizing file 11 with the current value of the high-frequency current within the predetermined range based on the product of the current value detected by detector 20 when the preliminary current flows through file 11 and the energization period (first period) of the preliminary current (step S102B). Specifically, in order to reduce an inflammation factor, bacteria, and the like in the root canal, it is necessary to perform energization with a high-frequency current having a current value within the predetermined range during a predetermined period. For example, when file 11 is energized with a high-frequency current of 30 mA for 1 second, an inflammation factor, bacteria, and the like in the root canal can be reduced. Therefore, control circuit 21 passes the preliminary current through file 11 during the first period to determine the voltage value of high-frequency signal generation circuit 19 and the energization period for obtaining the current value of the high-frequency current necessary for the root canal treatment to reduce an inflammation factor, bacteria, and the like in the root canal from the product of the current value actually flowing through file 11 and the energization period. It goes without saying that control circuit 21 may pass the preliminary current through file 11 to determine either the voltage value of high-frequency signal generation circuit 19 or the energization period for obtaining the current value of the high-frequency current with which file 11 is energized based on the product of the current value detected by detector 20 and the energization period. For example, the energization period is predetermined, and control circuit 21 determines only the voltage value of high-frequency signal generation circuit 19 for obtaining the current value of the high-frequency current with which file 11 is energized based on the product of the detected current value and the energization period. Note that control circuit 21 calculates the impedance of the root canal from the current value detected by detector 20 and a corresponding voltage value applied to high-frequency signal generation circuit 19, and determines the voltage value of high-frequency signal generation circuit 19 for obtaining the current value with which file 11 is energized with the root canal having the impedance.

After the elapse of the first period, control circuit 21 pauses the energization of file 11 by high-frequency signal generation circuit 19 during the pause period (step S103). In order to count the frequency of energization with the high-frequency current during the second period, control circuit 21 increments an energization frequency counter by one (step S104). Control circuit 21 causes high-frequency signal generation circuit 19 to energize file 11 with the high-frequency current based on the voltage value of high-frequency signal generation circuit 19 and during the second period determined in step S102B (step S105). Control circuit 21 energizes file 11 with the high-frequency current and determines whether the current value detected by detector 20 falls within the predetermined range (step S106).

When the detected current value falls within the predetermined range (YES in step S106), control circuit 21 determines whether the energization frequency counter is greater than or equal to N (for example, 10) (step S107). When the energization frequency counter is not greater than or equal to N (NO in step S107), control circuit 21 returns the processing to step S103 and repeats the control of the pause period and the second period. Note that, as described in the second embodiment, when the energization frequency counter is not greater than or equal to N (NO in step S107), control circuit 21 may return the processing to step S101 and repeat the control of the first period, the pause period, and the second period. On the other hand, when the energization frequency counter is greater than or equal to N (YES in step S107), control circuit 21 resets the energization frequency counter to 0 (zero) (step S108) and stops the process of energizing file 11 with the high-frequency current.

Returning to step S106, when the detected current value falls outside the predetermined range (NO in step S106), control circuit 21 displays, on display 14, information showing that the current value of the high-frequency current with which energization is performed falls outside the predetermined range (step S110).

Next, control circuit 21 energizes file 11 with the high-frequency current and determines whether the current value detected by detector 20 is less than the minimum current value of the predetermined range (step S111). When the detected current value is less than the minimum current value of the predetermined range (YES in step S111), control circuit 21 displays, on display 14, information showing that the process of energizing file 11 with the high-frequency current needs to be performed again (step S112).

Further, control circuit 21 measures the energization period where the detected current value is less than the minimum current value of the predetermined range (step S113).

Returning to step S111, when the detected current value is not less than the minimum current value of the predetermined range (NO in step S111), control circuit 21 can determine that the detected current value is greater than the maximum current value of the predetermined range, and thus stops the process of energizing file 11 with the high-frequency current (step S115). Control circuit 21 displays, on display 14, information showing that the process of energizing file 11 with the high-frequency current is stopped (step S116).

As described above, in dental treatment apparatus 10 according to the third embodiment, control circuit 21 causes high-frequency signal generation circuit 19 to control at least either the current value of the high-frequency current with which file 11 is energized or the energization period where file 11 is energized with the high-frequency current so as to make the product of the current value detected by detector 20 and the energization period of the high-frequency current greater than or equal to the predetermined value.

With such a configuration, dental treatment apparatus 10 according to the third embodiment causes high-frequency signal generation circuit 19 to control at least either the voltage value of high-frequency signal generation circuit 19 or the energization period for obtaining the current value of the high-frequency current with which file 11 is energized based on the product of the current value detected by detector 20 and the energization period, so that file 11 placed at the dental treatment site can be energized with the high-frequency current having the current value within the predetermined range even under various changing situations.

Modification

A dental treatment apparatus 10 that energizes a dental treatment site with a high-frequency signal includes a file holder 13 that holds a file 11 placed at the dental treatment site, a high-frequency signal generation circuit 19 that energizes file 11 with the high-frequency current under constant current drive, and a control circuit 21 that causes high-frequency signal generation circuit 19 not to start or to stop the energization of file 11 with the high-frequency signal when a voltage value of an output voltage of high-frequency signal generation circuit 19 is greater than or equal to a predetermined value. This allows dental treatment apparatus 10 to control the high-frequency current with which file 11 is energized under constant current drive. Further, when the voltage value of the output voltage of high-frequency signal generation circuit 19 becomes greater than or equal to the predetermined value, and the energization of file 11 with the high-frequency current by high-frequency signal generation circuit 19 is stopped, control circuit 21 may cause a notification unit (for example, a display 14) to output information showing that the energization with the high-frequency current is stopped.

The dental treatment apparatus is not limited to a configuration where file holder 13 to which file 11 is attached is provided to allow the measurement of the root canal length and the energization with the high-frequency current to be made as described in the above embodiments, and may be combined with a configuration where the treatment tool is motor-driven, a configuration where the treatment tool is ultrasonic-driven, or the like.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A dental treatment apparatus that energizes root canals to be treated with a high-frequency current, the dental treatment apparatus comprising:

a holder configured to hold an electrode inserted into a root canal;

a power supply configured to energize the electrode with the high-frequency current;

a detector configured to detect a current value flowing through the electrode which energizes the electrode; and controller circuitry configured to cause, the power supply to energize the electrode with a current having a preliminary current for the root canal, and a current value of the preliminary current being less than a minimum current value of a predetermined range and based on the current value of the preliminary current flowing through the electrode detected by the detector, the power supply is further configured to control the current to be a current value of the high-frequency current energizing the electrode to be within the predetermined range for root canal treatment or a time period where the electrode is energized with the high-frequency current having the current value within the predetermined range.

2. The dental treatment apparatus according to claim 1, wherein the controller circuitry is further configured to provide a pause period between a first period, where the power supply energizes the electrode with the preliminary current, and a second period, where the power supply energizes the electrode with the high-frequency current.

3. The dental treatment apparatus according to claim 2, wherein the controller circuitry is further configured to make the first period shorter than the second period.

4. The dental treatment apparatus according to claim 2, wherein the controller circuitry is further configured to cause the power supply to repeatedly energize the electrode with the high-frequency current, with the first period, the pause period, and the second period being set as one period.

5. The dental treatment apparatus according to claim 1, wherein when the current value detected by the detector of the current is greater than a maximum current value of the predetermined range, the controller circuitry is further configured to cause the power supply not to start the energizing of the electrode with the high-frequency current.

6. The dental treatment apparatus according to claim 1, wherein when the current value of the current detected by the detector fails outside the predetermined range, the controller circuitry is further configured to cause output of information showing that the current value falls outside the predetermined range.

7. The dental treatment apparatus according to claim 1, wherein when the current value of the current detected by the detector is greater than a maximum current value of the predetermined range, and the power supply-does not start energizing the electrode with the high-frequency current, the controller circuitry is further configured to cause output of information showing that the energization with the high-frequency current does not start, and when the current value of the current detected by the detector is less than the minimum current value of the predetermined range, the controller circuitry is further configured to cause output of information.

8. The dental treatment apparatus according to claim 1 wherein the controller circuitry is further configured to measure a time when a current value of the current detected by the detector is less than the minimum current value of the predetermined range, and to cause output of the time measured.

9. The dental treatment apparatus according to claim 1, wherein when the current value of the current detected by the detector falls within the predetermined range but changes by at least a predetermined percentage, the controller circuitry is further configured to cause output of information showing that the current value of the high-frequency current changes abruptly.

10. The dental treatment apparatus according to claim 1, wherein the controller circuitry is further configured to cause, based on the current value of the current detected by the detector, the power supply to control a time period where the electrode is energized with the high-frequency.

11. The dental treatment apparatus according to claim 1, wherein the controller circuitry is further configured to cause the power supply to control at least either the current value of the high-frequency current or a time period where the electrode is energized with the high-frequency current to make a product of the current value detected by the detector and a time period where the energizing with the high-frequency current is performed greater than or equal to a predetermined value.

12. A method for controlling a dental treatment apparatus that energizes root canals to be treated including a holder that holds an electrode inserted into a root canal, a power supply that energizes the electrode with a high-frequency current, a detector that detects a current value flowing through the electrode which energizes the electrode, and controller circuitry that causes the power supply to control a current value of the high-frequency current which energizes the electrode, the method comprising:

detecting, by the detector, a current value of a current having a preliminary current which energizes the electrode for the root canal and a current value of the preliminary current being less than a minimum current value of a predetermined range; and controlling, by the controller circuitry, based on the current value of the preliminary current flowing through the electrode detected by the detector, the current value of the high-frequency current which energizes the electrode to be within the predetermined range for root canal treatment and/or a time period where the electrode is energized with the high-frequency current having the current value within the predetermined range by controlling the power supply.

* * * * *